United States Patent
Hoskins et al.

(10) Patent No.: US 10,928,270 B2
(45) Date of Patent: Feb. 23, 2021

(54) MONITORING FLUID DYNAMICS

(71) Applicant: IMPERIAL INNOVATIONS LIMITED, London (GB)

(72) Inventors: Asher John Hoskins, West Sussex (GB); Ivan Iordanov Stoianov, London (GB)

(73) Assignee: IP2IPO INNOVATIONS LIMITED, London (GB)

( * ) Notice: Subject to any disclaimer, the term of this patent is extended or adjusted under 35 U.S.C. 154(b) by 359 days.

(21) Appl. No.: 15/766,898

(22) PCT Filed: Oct. 10, 2016

(86) PCT No.: PCT/GB2016/053146
§ 371 (c)(1),
(2) Date: Apr. 9, 2018

(87) PCT Pub. No.: WO2017/060737
PCT Pub. Date: Apr. 13, 2017

(65) Prior Publication Data
US 2018/0292290 A1 Oct. 11, 2018

(30) Foreign Application Priority Data

Oct. 9, 2015 (GB) ..................................... 1517901

(51) Int. Cl.
*G01M 3/28* (2006.01)
*G01F 1/34* (2006.01)
*G01F 1/74* (2006.01)

(52) U.S. Cl.
CPC ............. *G01M 3/2815* (2013.01); *G01F 1/34* (2013.01); *G01F 1/74* (2013.01); *G01N 2291/02872* (2013.01)

(58) Field of Classification Search
CPC ........... G01M 3/2815; G01F 1/34; G01F 1/74
See application file for complete search history.

(56) References Cited

U.S. PATENT DOCUMENTS 3,962,905 A   6/1976  Jouve
7,412,876 B2 * 8/2008  Kates .................. G01M 3/2815
                                                    73/40
(Continued)

FOREIGN PATENT DOCUMENTS

DE   102011078240 A1   1/2013
DE   102013224752 A1   1/2015
(Continued)

OTHER PUBLICATIONS

International Search Report and Written Opinion for PCT/GB2016/053146, dated Dec. 21, 2016, 17 pages.
GB Search Report for GB1507140.0, dated Apr. 8, 2016, 5 pages.

*Primary Examiner* — Bryan Bui
(74) *Attorney, Agent, or Firm* — Dorsey & Whitney LLP (57) ABSTRACT

There is provided a method and an apparatus analysing the condition of a liquid conduit system. Data is received from at least one sensor indicative of pressure within the system and then processed to generate an inflexion coded data subset for each sensor. The inflexion coded data is then cycle counted across at least one time period to generate a second data subset for each time period comprising a count of pressure cycles, the amplitude of these pressure cycles and an average pressure. A cumulative pressure-induced stress can then be calculated for each of the at least one time periods using the second data subset.

20 Claims, 10 Drawing Sheets

(56) References Cited

U.S. PATENT DOCUMENTS

| | | | |
|---|---|---|---|
| 7,920,983 | B1 | 4/2011 | Peleg et al. |
| 10,030,818 | B2 * | 7/2018 | Hoskins .................... G01F 1/00 |
| 2013/0197833 | A1 | 8/2013 | Israeli et al. |

FOREIGN PATENT DOCUMENTS

| | | |
|---|---|---|
| EP | 2060896 A1 | 5/2009 |
| EP | 2477088 A1 | 7/2012 |
| FR | 2910619 A1 | 6/2008 |
| WO | 2014083340 | 6/2014 |

\* cited by examiner

MONITORING FLUID DYNAMICS

CROSS-REFERENCE TO RELATED APPLICATIONS

This application is the national stage application of International Patent Application No. PCT/GB2016/053146, filed on Oct. 10, 2016, and entitled "Monitoring Fluid Dynamics", which claims priority to GB Patent Application No. 1517901.3, filed on Oct. 9, 2015, and entitled "Monitoring Fluid Dynamics", the entire contents of which are hereby incorporated by reference herein in their entireties for all purposes.

FIELD

The present disclosure relates to monitoring fluid flow in a conduit and analysing the pressure variations. In particular, but not exclusively, the disclosure can provide method and apparatus for monitoring the dynamic hydraulic conditions within a water distribution system in order to assess the impact of pressure variations on pipe deterioration and failures.

BACKGROUND

The hydraulic conditions within water supply systems are not steady, although the design of the physical components within such systems and their respective simulation models often assume steady state flow conditions. In fact, hydraulic conditions within water distribution networks are frequently quasi-steady and unsteady due to myriad factors such as the stochastic nature of demand, operations of valves, pumps, malfunctioning surge protection devices, air valves, intermittency of supply and occasional bursts.

Pressure variations which may also include transient events can cause pressure-induced stress on components of the distribution system, potentially accelerating deterioration mechanics and leading to failures. As a result, techniques have been developed to monitor the dynamic hydraulic conditions in order to identify salient pressure variations, assess potential risks or analyse transient events and hydraulic dynamics that lead to failures. This knowledge will enable water system operators to continuously monitor the "health" of a system, prioritise operational interventions, extend the life cycle of ageing assets and improve system management.

International patent application WO2014/083340 describes a device and system for, and a method for, monitoring fluid flow in a conduit. In comparison to alternative monitoring techniques employed in the art, the disclosure of this document provides an approach which allows a greater insight into the dynamic hydraulic conditions, particularly as it facilitates effectively continuous monitoring of such conditions within the system rather than the detection of discrete pressure transient events only. An extensive and continuous characterisation of pressure variations and their cumulative impact together with the characterization of individual extreme events can thus be achieved in order to improve understanding of the system dynamics.

Notwithstanding the above, there remains a need to improve the understanding of the effect of the dynamic hydraulic conditions, and this includes both transient unsteady events and quasi unsteady-state pressure variations, on the durability, reliability and deterioration and failure of system components. Water distribution systems remain subject to maintenance and reliability concerns, and there is a continuing need to improve these aspects in order to increase the life expectancy of critical assets and operational efficiency. While previous approaches have proved to have some efficacy in identifying extreme transient events, and thereby potentially reacting to failures as and when they occur, they have had limited success in characterising the full range of pressure variations and consequently the impact of pressure-induced stress on components deterioration and their risk of failure The latter is used to prioritise operational interventions to achieve and maintain optimal steady-state flow conditions.

SUMMARY

According to a first aspect of the disclosure, there is provided a method for analysing the dynamic flow conditions of a liquid conduit system, comprising:
 receiving data from at least one sensor indicative of pressure within the system;
 processing the data to generate an inflexion coded data subset for each sensor;
 cycle counting the inflexion coded data across at least one time period to generate a second data subset for each time period comprising a count of pressure cycles, the amplitude of the pressure cycles and an average pressure; and
 calculating a cumulative pressure-induced stress for each of the at least one time periods using the second data subset.

According to a second aspect, there is provided an apparatus for analysing the dynamic flow conditions of a liquid conduit system, comprising:
 one or more sensors configured to provide data indicative of pressure within the system;
 one or more processors configured to:
  receive data from at least one sensor indicative of pressure within the system;
  process the data to generate an inflexion coded data subset for each sensor;
  cycle count the inflexion coded data across at least one time period to generate a second data subset for each time period comprising a count of pressure cycles, the amplitude of the pressure cycles and an average pressure; and
 calculate a cumulative pressure-induced stress for each of the at least one time periods using the second data subset.

These aspects of the disclosure can allow an effective and efficient processing method for generating cumulative pressure-induced stress data relating to the liquid conduit system as a whole and also for individual components (e.g. pipe sections, valves). Rather than focussing solely on extreme high amplitude but less frequent transient events, the generation of inflexion data and subsequent processing to derive cumulative pressure-induced stress information allows a deeper understanding of potential fatigue-related mechanisms of failure on components of the liquid conduit system. The use of inflexion coded data and subsequent analysis can allow a high volume of data to be efficiently represented, stored and managed with minimal overheads in a distributed monitoring setup.

Inflexion coded data may capture the changes or turning points in the pressure data identified by the sensors. The inflexion coded data may be a vector representation of the data comprising a plurality of line segments. For example, inflexion coded data may represent the data received from the one or more sensors as a series of alternating up and down pressure time series edges. Each edge may have a duration and absolute magnitude. Processing the data to generate the inflexion coded data subset may comprise quantisation, optionally hysteretic quantisation, of the data received from the one or more sensors. It may further comprise identifying extrema within the quantised data.

The data from the sensor is preferably continuous or substantially continuous. This can help to ensure a complete overview of pressure-induced stress within the system is obtained. For example, sensor data may be sampled at greater than 100 samples per second, preferably around 128 samples per second.

In preferred embodiments, the at least one time period comprises a first set of time periods of a first duration, and a second time period of a second duration encompassing the first set of time periods. For example, in particularly preferred embodiments, the first duration is one hour and the second duration is 24 hours. By using time periods of different durations, the pressure-induced cumulative stress can be used to promptly identify and inform the operator of changes in the dynamic flow conditions thus optimizing data communication and operational interventions.

Some preferred embodiments may further comprise calculating a rate of pressure-induced stress accumulation during the second time period from the calculated cumulative stress for each of the first set of time periods. In this manner, both the rate of accumulation and the cumulative stress during the second time period can be readily established.

Preferably, the step of receiving data comprises receiving data from a plurality of sensors. Accordingly, the pipe conduit system may be monitored at a plurality of locations and data from those locations may be considered together in order to achieve a more complete understanding.

Some preferred embodiments further comprise deriving a network connectivity schematic representing shortest hydraulic paths between the plurality of sensors; and estimating cumulative pressure-induced stress at locations and pipes between the sensors using the network connectivity schematic. The step of estimating may further make use of one or more of: physical properties of the pipe material; fluid propagation; and wave propagation. This allows information not just at each sensor but at positions and components intermediate to the sensors to be established.

The disclosure may also provide an asset/component risk ranking for a location using cumulative pressure-induced stress calculated for that location and a stored criticality rating (a critical link rating) for that location (and/or pipe link). The criticality rating may quantify the impact of a pipe failure on system reliability and performance. In this manner, maintenance schedules may be automatically prioritised on the basis of the cumulative pressure induced stress, pipe material, criticality of a component for the system reliability and the potential impact of a failure.

Preferred embodiments further comprise identifying a transient event, such as a pressure transient event, from the inflexion coded data. As such, in addition to cumulative pressure-induced stress data, individual transient events may be identified. Accordingly, while cumulative pressure-induced stress information may take account of high frequency and low magnitude events, high magnitude events can be recorded as transient events for further analysis.

Transient events can be recognised as events with rapid and high amplitude changes in pressure which are not common within the normal behaviour of a system. The step of identifying a pressure transient event may comprise comparing edges within the inflexion coded data with one or more probability distribution functions and identifying a pressure transient event when the probability of the edge is less than a threshold value. In this manner, effective identification of pressure transient events can be readily achieved.

Preferred embodiments comprise characterising the identified transient event by defining a symbolic word consisting of a string of symbols, each symbol representing an edge within the pressure transient event. They may also comprise storing the symbolic word characterising the transient event. This allows ready similarity searching and comparison of recorded pressure transient events to identify patterns and events of interest.

It can also be appreciated that the invention can be implemented using computer program code. Indeed, according to a further aspect there is therefore provided a computer program product comprising computer executable instructions for carrying out the method of the first aspect. The computer program product may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer or a distributed low power embedded systems configured to carry out the method described above.

BRIEF DESCRIPTION OF THE FIGURES

A preferred embodiment of the present disclosure will now be described with reference to the accompanying drawings, in which.

DETAILED DESCRIPTION

A distributed monitoring apparatus for continuous monitoring of conditions (particularly pressure) within a fluid conduit system is disclosed in International patent application WO2014/083340, the disclosure of which is incorporated herein in its entirety.

Figure 1:
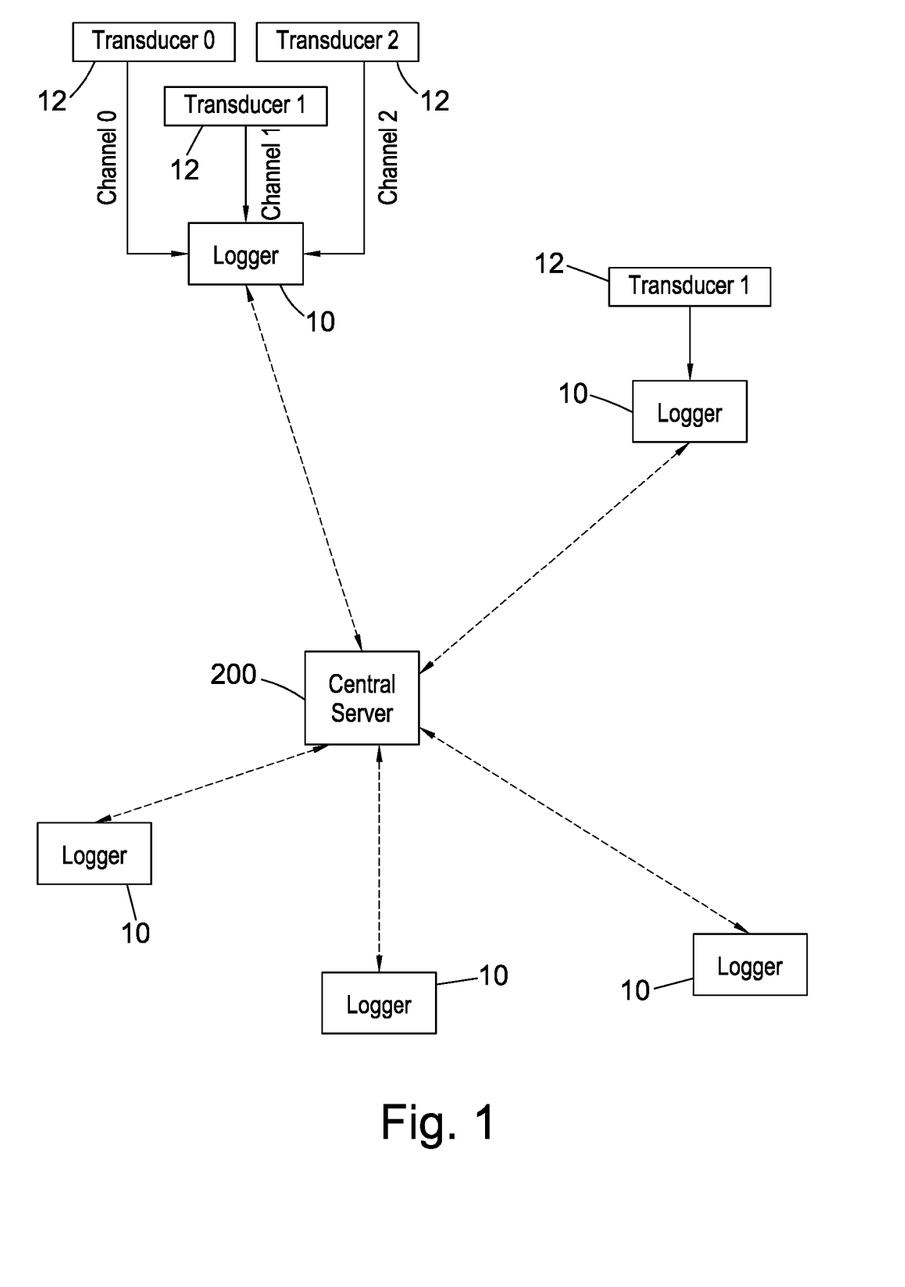
FIG. 1 is an overview in a schematic form of a liquid-flow monitoring system comprising a central control station and five remote devices.
Figure 2:
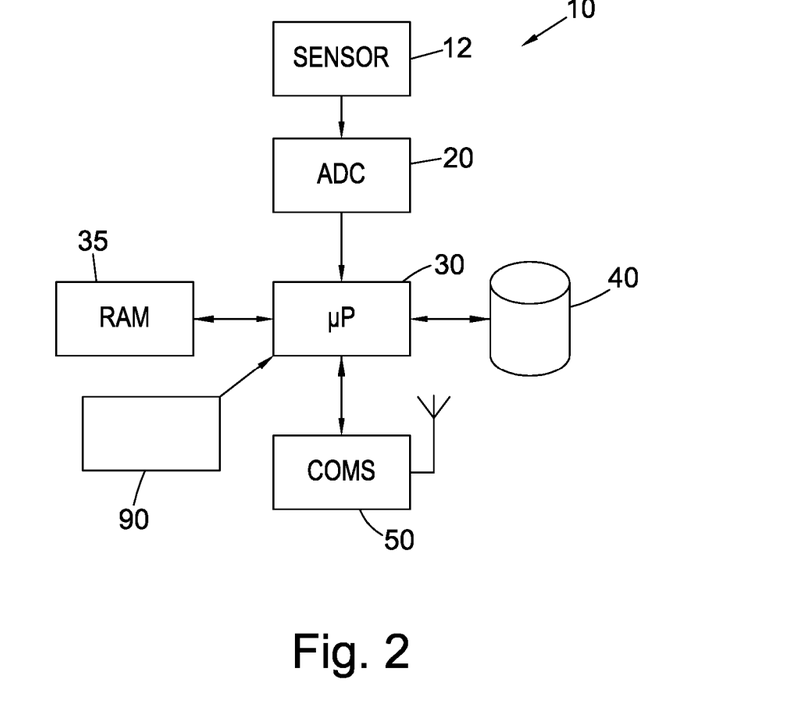
FIG. 2 is a schematic diagram of the hardware arrangement of a representative one of the remote devices.

Referring to FIGS. 1 and 2, elements of such an apparatus are presented. An overview of an apparatus 100 embodying the invention is shown in FIG. 1. As can be seen, the apparatus 100 is made up of a several remote devices 10 arranged to communicate with a central control station in the form of a server 200. In this embodiment, the communication is wireless communication as will be explained below. Each remote device 10 is a liquid-flow monitoring device arranged to monitor liquid flow in a conduit. Each device 10 is made up of several hardware components, each one carrying out several functions.

FIG. 2 shows in more detail, but in schematic form, the principal hardware components that make up a representative one of the devices 10.

The device includes sensing means in the form of a sensor 12. In this embodiment, the sensor 12 is arranged in a conduit of a water supply network, although it is envisaged that, in other embodiments, the sensor may be positioned for other fluid applications. The sensor 12 is arranged to sense a variable indicative of the water flow in the conduit. This may include, for example, the pressure, velocity, height, or temperature of the flow, or any other characteristic. In this example, the variable that is sensed is pressure. The sensor 12 provides the data indicative of the sensed pressure as a continuous signal.

The device 10 also includes sampling means 20 in the form of an analogue-to-digital converter (ADC) 20 that receives data from the sensing means 12 indicative of the sensed pressure. The ADC 20 is arranged to sample the data 25 at high-sampling rate (minimum of 1 Sample/s). In this embodiment, the data indicative of water pressure is sampled at a rate of 200 S/s. The ADC time-stamps each data point to output a stream of time-stamped sampled data 27. The data is time-stamped with high-accuracy, which in this embodiment is accurate to within milliseconds.

The output of the ADC 20 provides an input to processing means in the form of a micro-processor 30 that has RAM 35 associated therewith and accessible thereby. The device also includes storage means in the form of non-volatile memory 40, which in this embodiment is flash memory. The microprocessor 40 is arranged to communicate with the NVM 40 to read data therefrom and store data thereto. The device 10 further includes communication means in the form of a radio module 50 in operatively coupled to the microprocessor 30 and arranged to communicate in accordance with GSM and GPRS standards over a mobile cellular telephone network (not shown in FIG. 2) and/or other communication options.

Each device 10 of the apparatus 100 has one or more input channels of data streaming from respective sensors 12.

Although FIG. 2 shows, for simplicity, a device 10 with a single sensor 12 and a single channel of data therefrom, it is envisaged that other devices 10 in the apparatus 100 may have multiple sensors 12 each sensing different variable indicative of fluid flow. Each sensor 12 has a respective stream of continuous data therefrom, with each treated as an independent variable in a separate channel of the device 10. The sampling rates might be different for specific variables: for example: fluid pressure is measured at 200 S/s and fluid flow velocity at 1 S/s whereas temperature or battery voltage may be measured only once every 15 minutes. Water quality variables (chlorine and turbidity) are sampled at 15 mins but a faster sampling rate is triggered (5 mins) if a pressure transient is detected. Pressure can be used as a primary variable to trigger an increased sampling rate for the secondary variables. Data sources may also be generated by calculations upon one or more other data sources. For example, a boolean data source (one which may only have the values "true" and "false") representing the statement "a pressure transient has been detected" may be generated from a fluid pressure data source.

Figure 3:
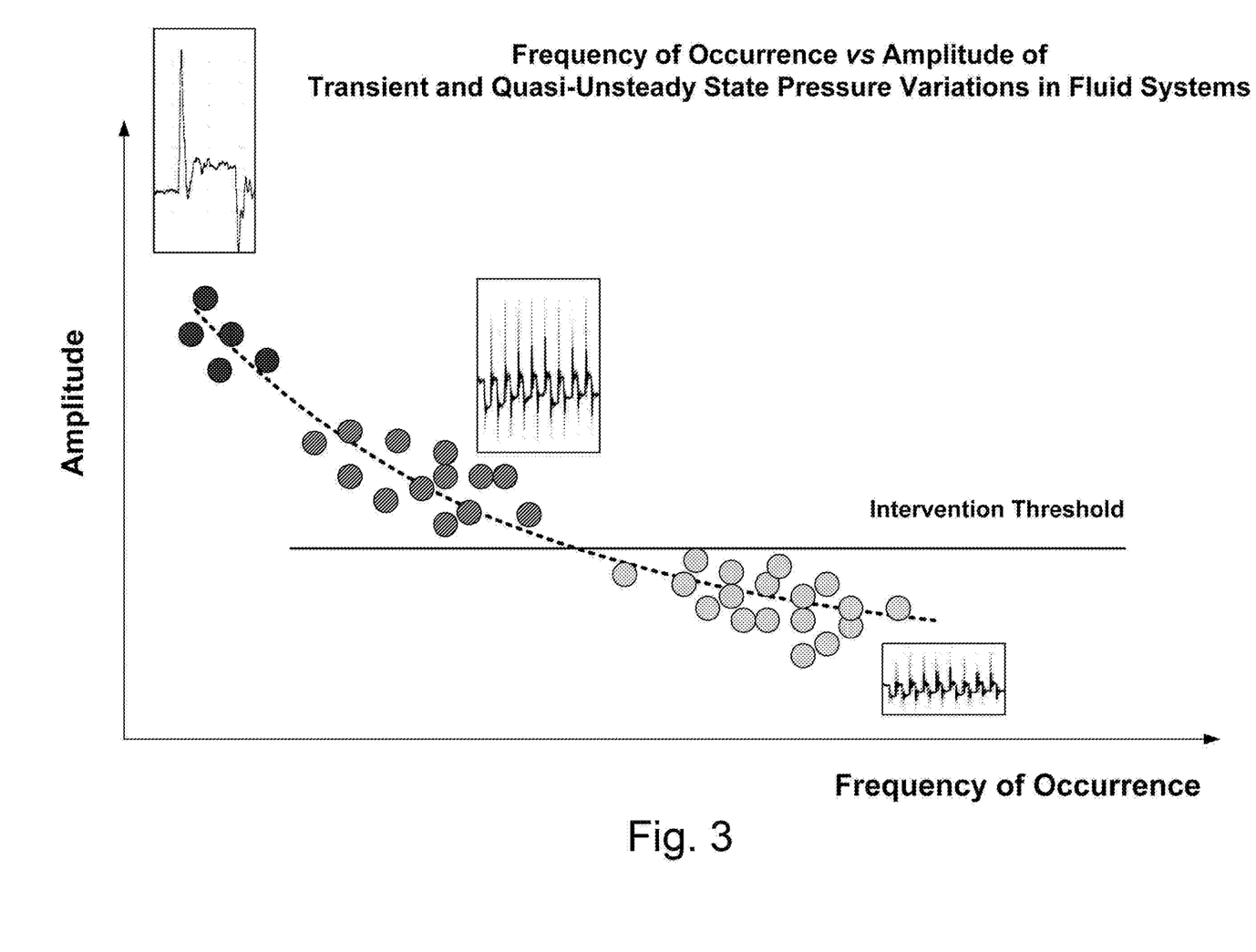
FIG. 3 shows a distribution of pressure event frequency.

Monitoring the fluid dynamics in operational networks using the method and device described above, the distribution of transient events can be schematically summarised in FIG. 3. In general, a small number of pressure variation events have a very large amplitude, while a large number of events have a medium to small amplitude. Processes which monitor pressure transients to extract significant events thus completely ignore the cumulative impact of the fluid dynamics on the resulting pipe stress. Consequently, little has been previously known about the impact of the gradual and sudden pressure variations on the deterioration of pipes and control assets and their correlation with pipe and component condition assessment and failures.

The fluid dynamics includes both rapid pressure variations (pressure transients, pressure surges) and gradual pressure variations (quasi-unsteady and steady state diurnal pressure changes). Complex pipe deterioration mechanisms such as fatigue corrosion and stress corrosion cracking can be significantly accelerated by the cumulative pressure-induced stress imposed on pipes and control assets from the fluid dynamics. This phenomenon has been largely ignored by the water industry because of the lack of methods and technologies to continuously measure the cumulative pressure-induced stress and correlate this with operational behaviour and failure mechanisms and histories.

The present disclosure allows for both low frequency of occurrence/high amplitude and high-frequency of occurrence/low amplitude pressure events to be captured and characterised so that individual transient events and cumulative pressure-induced stress are available to the operator within a risk-based "pipe stress" warning system.

The described metrics and methods and their implementation enable utility operators to prioritise interventions and repairs (early asset stress warning) to maintain steady-state hydraulic conditions, and assess the long term impact of the dynamic hydraulic behaviour on assets failures (pipes, pumps, control valves, air valves, surge vessels etc). The methods also enable the optimal information extraction from very large data sets acquired from a highly distributed monitoring system (asset health monitoring and high-resolution snippets of extreme events).

Figure 4:
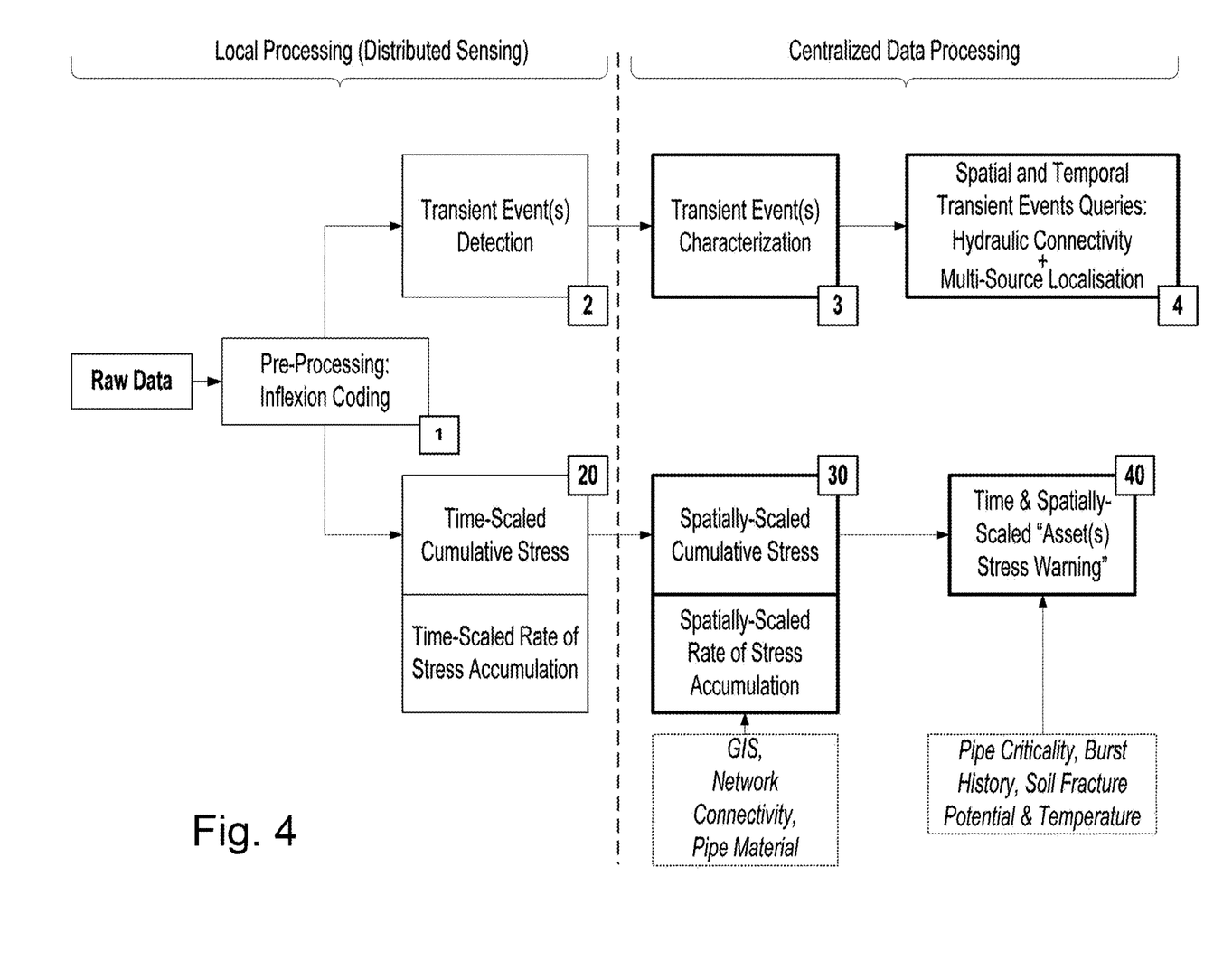
FIG. 4 shows an overview of a process according to a preferred embodiment.

An overview of a method for analysing the condition of a liquid conduit system can be seen in FIG. 4. This process enables both extreme transient events and a cumulative pressure loading from complex quasi-unsteady and unsteady-state pressure profiles to be continuously captured, analysed and presented within a risk-based stress warning system. A distributed monitoring apparatus such as that described with reference to FIGS. 1 and 2 above and in international application WO2014/083340 is installed to continuously monitor pressure (~128 S/s) within a water supply network. The distributed devices are generally battery powered and they need to be ultra-low power to meet the industry requirements for long-term unattended operation. The various analyses included in the presented method are split between the embedded devices (local processing) and a centralized server. The power constraint presents significant challenges for the development of the embedded algorithms and methods.

Figure 5:
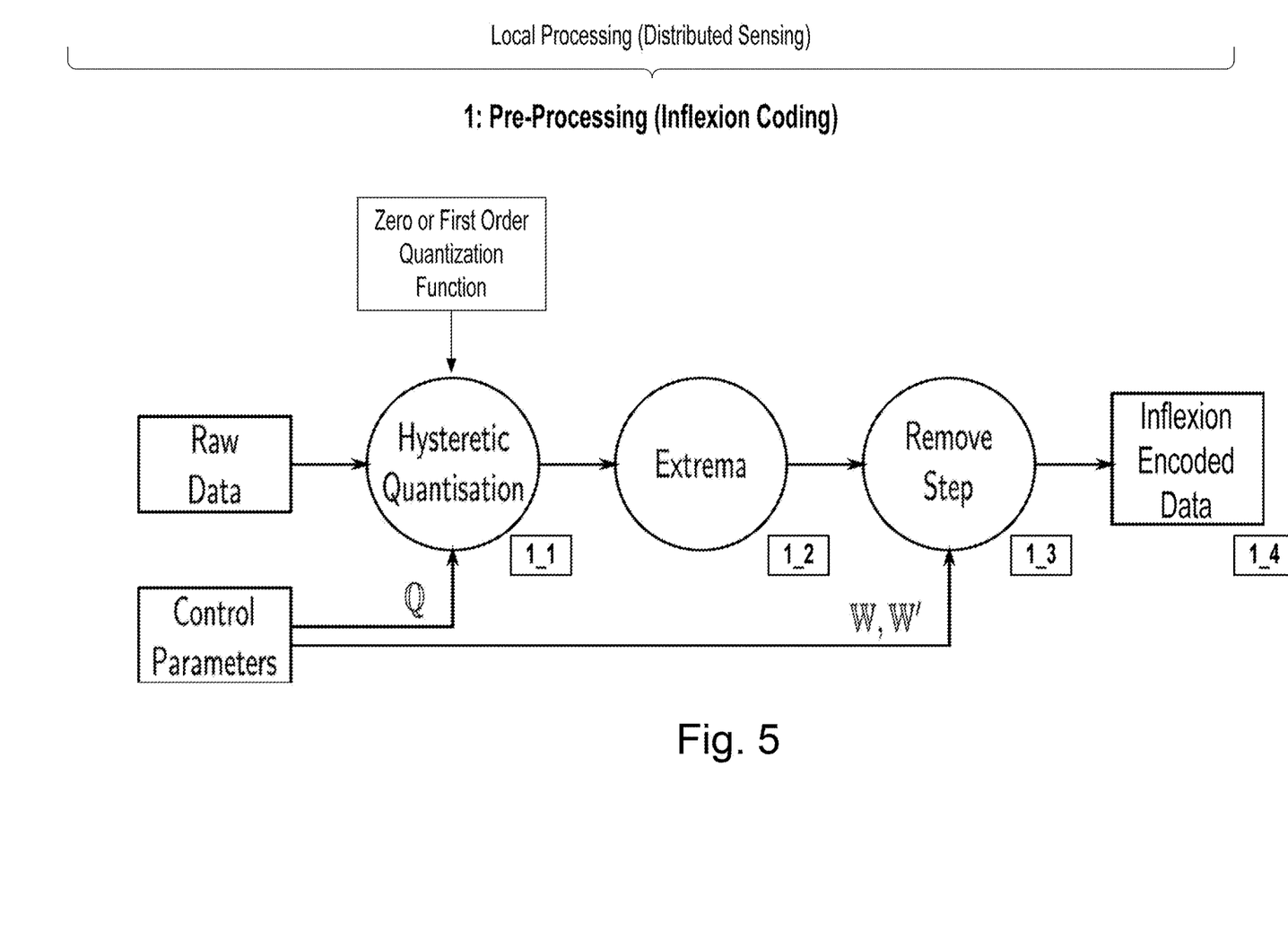
FIG. 5 illustrates a pre-processing step to generate inflexion coded data.

As can be seen in FIG. 4, raw data is received from sensors at step 1. A pre-processing step of inflexion coding is then carried out. This process is illustrated in greater detail in FIG. 5. The raw data is encoded into a series of vectors using a zero (or first order) quantization function (step 1_1) and a piece-wise linear approximation method comprising identification of extrema (step s1_2) and a remove step during which flat sections are removed from the data (step s1_3). An output of inflexion coded data (i.e. a continuous signal represented (encoded) by piecewise linear approximations defined by consecutive inflexion points) is thus provided at step s1_4. The inflexion coded data comprises a series of linear segments, referred to as "edges", of defined magnitude and duration. This vector format enables compression and improves data handling and processing.

As illustrated in FIG. 4, parameters Q, W and W' may be defined for use in the inflexion coding process. Q is a parameter (threshold) controlling the minimum "noise threshold" in the acquired pressure. The parameters W and W' control the step size (W=minimum length of a quantization window) and (W'=minimum length of a flat step) for the hysteretic quantization.

Referring back to FIG. 4, it can be seen that parallel processing paths are implemented based on the inflexion coded data. An upper path comprising steps 2, 3, and 4 allows the identification of pressure transient events while a lower path comprising steps 20, 30 and 40 allow an understanding of cumulative pressure-induced stress and the rate of accumulation of pressure-induced stress in the system. In combination, a full understanding of both high frequency of occurrence low impact and low frequency of occurrence high impact events can thus be achieved thus encapsulatin the full range of pressure variations.

Figure 6:
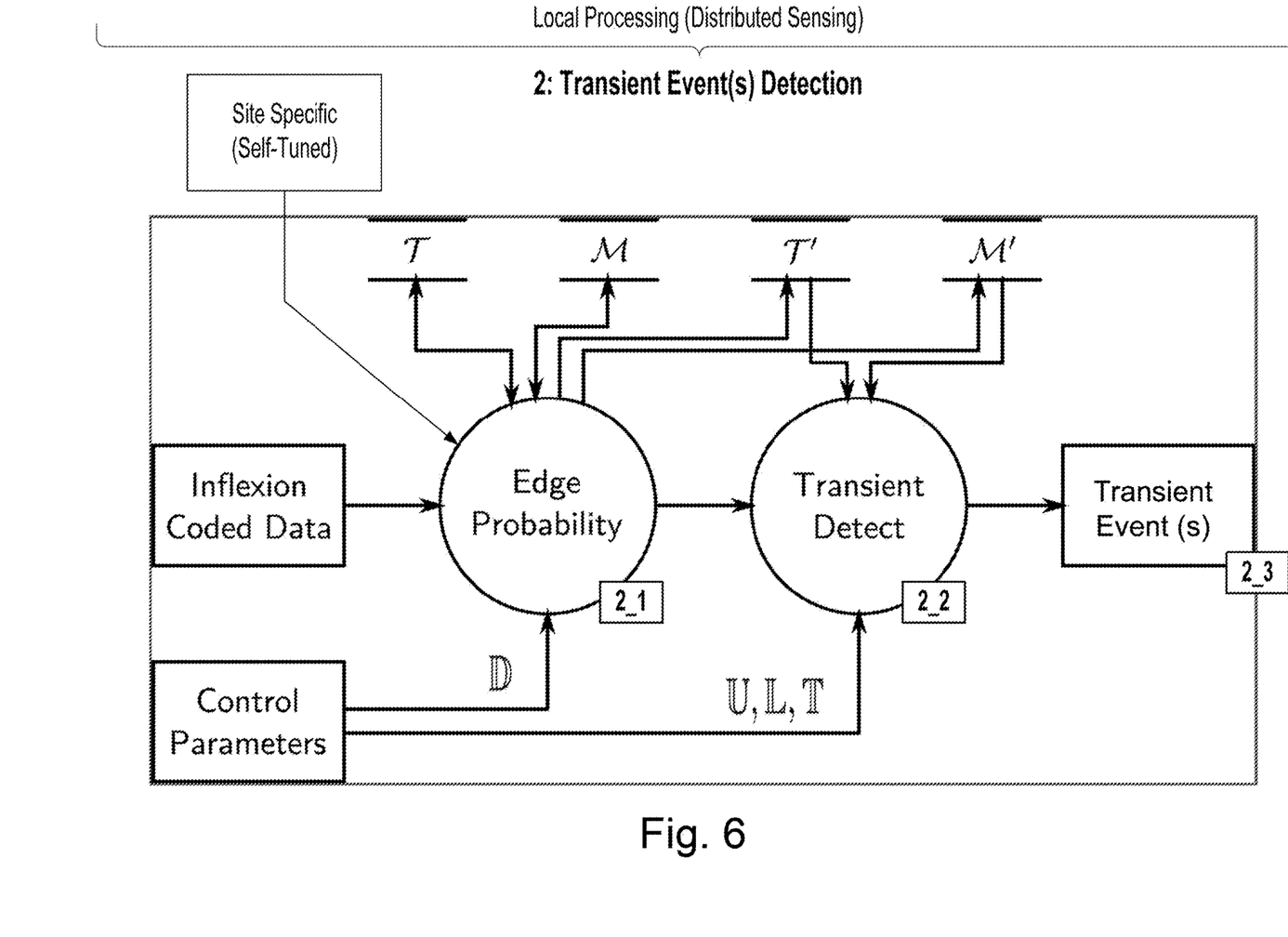
FIG. 6 illustrates a transient event detection step.

Referring now to the upper path, step 2 can be understood in greater detail with respect to FIG. 6. Using either a single two-dimensional cumulative distribution function (CDF) or two one-dimensional CDFs, the probability of each edge's duration and absolute magnitude is calculated (step 2_1). Edges whose combined probability is below a probabilistic threshold (and which are therefore "unlikely") are used to identify pressure transient events (step 2_2). Allowances are made for "holes", short non-transient edges, within a complete transient event. An output of identified transient events is then provided at step 2_3.

This process may use the generation of two probability distribution functions (expressed as unordered sets which may include repeated values) from the duration, T, and absolute magnitude, M, of each edge in the inflexion data.

These distributions contain values collected over a fixed time period (duration D). At the end of each period the current T and M are used to create a pair of historic distributions, T' and M'. T' and M' can also be communicated and aggregated to define "absolute" distributions over multiple locations which can be labelled T" and M".

In this way, the distribution functions are able to capture/reflect changes in the pressure signal over time rather than holding the average over the entire data set. Consequently, two thresholds can be derived based on T' and M' and T" and M": T' and M' identify local changes while T" and M" identify absolute thresholds. The algorithm emits its input values unchanged, using the output tuple to clock the next step in the dataflow.

The Transient Event(s) Detection process (FIG. 6) may use the historic distributions described above (based on data sampled over, for example, 1-2 weeks after a monitoring device is installed) in order to ensure that transient detections are done using complete probability distributions covering a pre-defined period, D.

A "transient" edge may be detected when the probability of both its duration and magnitude falls below a threshold, U. The magnitude and duration distributions may be treated as independent variables in order to allow the algorithm to be implemented on devices with memory constraints. The storage requirements of two independent distributions with 'delta' possible values (distributions are generally implemented using a fixed number of 'bins' rather than as a variable-sized set of arbitrary values) is 2*delta whereas a single distribution recording all possible combinations of magnitude and duration would be delta$^2$.

Transients are made up of more than one edge and typically not all of the edges within a detected transient would have a probability less than the threshold. To solve this, the "L" trailing edges following a transient edge may be counted as part of the transient, even if they are not transient themselves.

A cut-off time value, T, is used to stop long at edges following transients from being included as part of the transient. In order that both ends of a transient edge are output the L parameter must have a value of at least one.

The algorithm is "site and self-tuned". A logging device is installed, it then collects data over a minimum period of 24 hours (preferably at least 1 week), before it tunes the variables outlined in the Figures.

Figure 7:
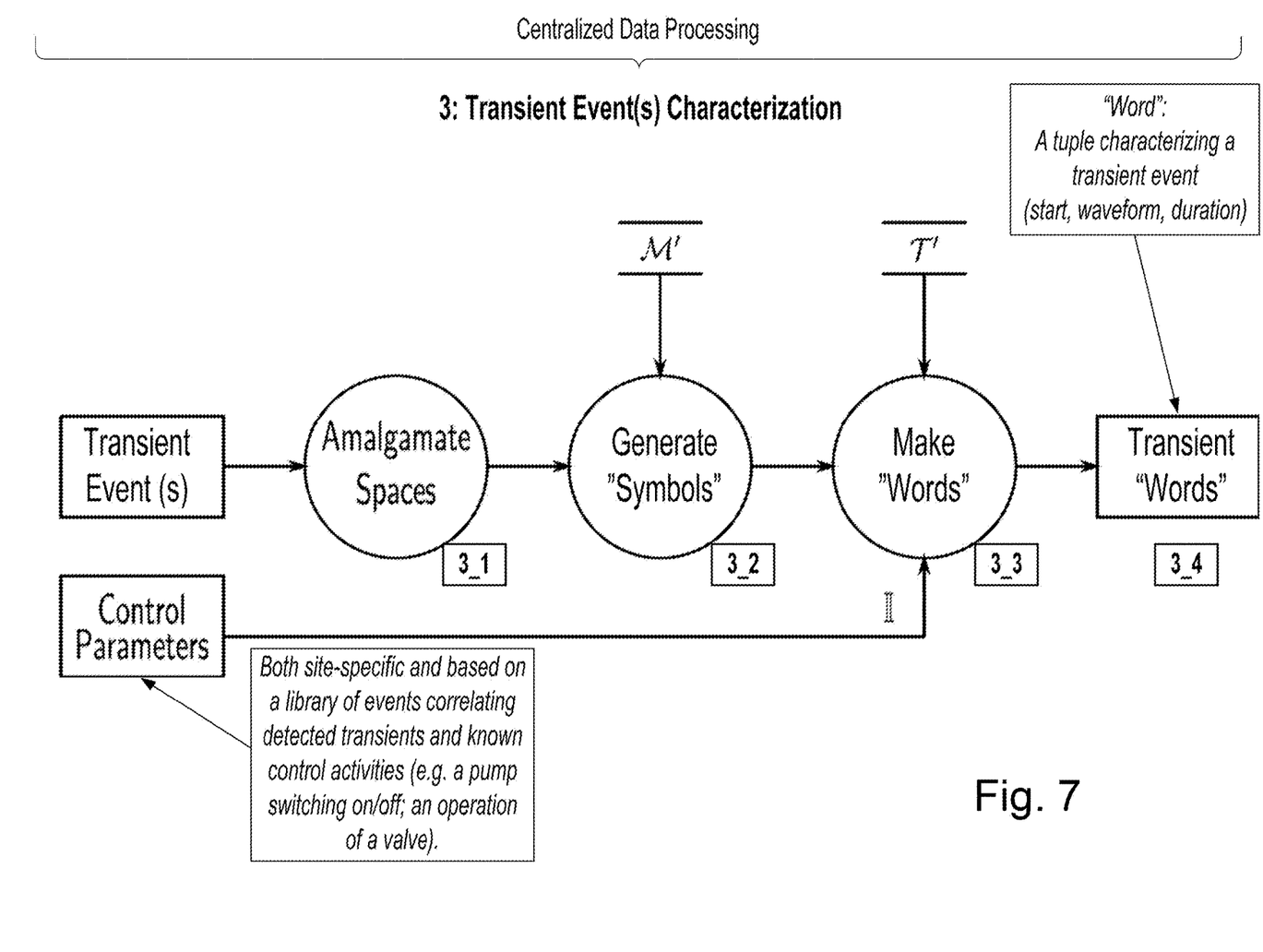
FIG. 7 illustrates a transient event characterisation step.

Step 3 is illustrated in greater detail in FIG. 7. Here, the transient events identified in step 2 are characterised. A complete transient event is referred to as a "word", with the edges represented as "symbols". The symbols are normalised over each individual pressure transient event so that these can be used to optimally encode the waveform of a transient. This method of encoding transient events ("word"="string of symbols") allows for the implementation of "approximate string matching"; a technique for finding strings that approximately match a pattern. All non-transient edges between words are amalgamated together into single "spaces". The entire input data stream may then be treated as a series of space-separated words. Detected pressure transients (pressure waves) at multiple sensing locations would rarely have identical patterns due to the energy dissipation and reflections.

The characterisation of transient events described above enables the implementation of data retrieval queries that search for the temporal and spatial repeatability of specific transient events at step 4. Applications that are supported by this method include the localisation of the source of pressure transients, validation of network hydraulic connectivity and exploring changes of the system response to repeatable excitations (system identification).

Referring now to the lower path shown in FIG. 4, this path offers analysis of the cumulative pressure-induced stress within the system.

Figure 8:
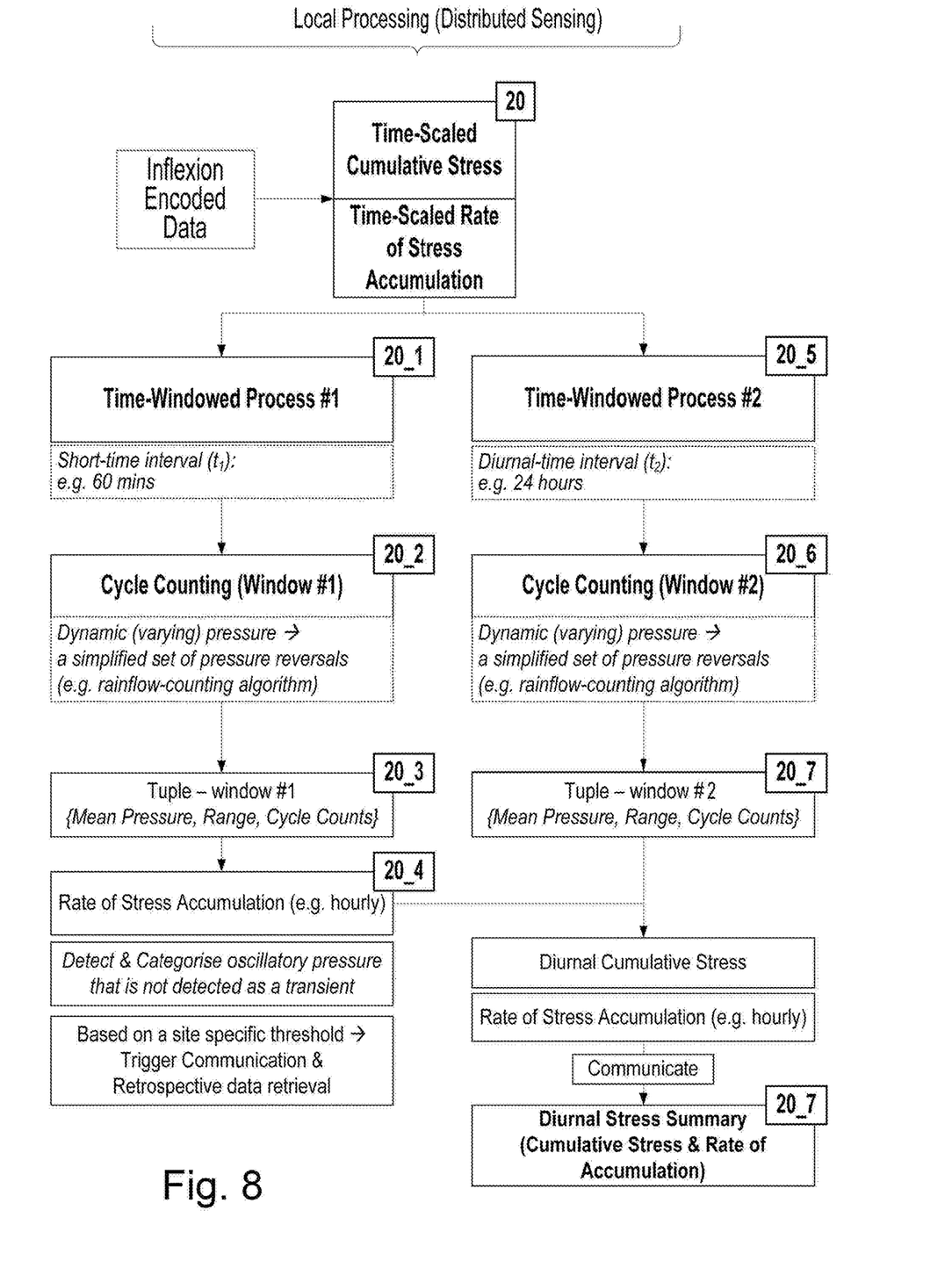
FIG. 8 illustrates a load processing operation to calculate cumulative pressure-induced stress.

FIG. 8 illustrates a local processing procedure at each device. Here, further parallel paths are provided to offer analysis across time periods of different durations. In the particular example shown, these durations are one hour and 24 hours. At step 20_1 data is captured for one hour while at step 20_5 it is captured for 24 hours.

A cycle counting process is then carried out on each set of captured data (at steps 20_2 and 20_6). In particular, the cycle counting process may comprise a rainflow-counting algorithm, although alternative cycle counting methods may be used as appropriate. Using the results of the cycle counting, a tuple can be derived for each time period (at steps 20_3 and 20_7), each tuple representing {mean pressure, amplitude of pressure cycles, cycle counts} In this way, the complex spectrum of pressure variations is reduced to a set of simplified pressure oscillations for the calculation of cumulative pressure-induced pipe stress from {mean pressure, amplitude of pressure cycles, cycle counts}.

The mean pressure within the tuple represents the average pressure over the period. The cycle count represents the number of cycles of pressure in this period, and the amplitudes represent the amplitudes of these cycles. The amplitudes may be recorded as a distribution of amplitudes within certain ranges. For example, the mean pressure is calculated per a defined window: e.g. 1 hour. Within the 1 hour window, there will be cycles with different amplitude and all cycles and their amplitude can be counted thus presenting a distribution of amplitude vs cycles (counts). The cycle amplitudes can also be divided into "bands" to reduce overheads: e.g. 5 m pressure head (~0.5 bar).

The two-time windowed processes include:

a. Short-time period, for example 60 minutes. This process calculates the {mean pressure, amplitude of pressure cycles, cycle counts} within 60 mins and is used to capture/characterise pressure variations that include both unsteady (transient) and quasi-unsteady (gradual) pressure variations. It is also used to calculate the rate of stress accumulation within 24 hours (step 20_4).

b. Long-time period, for example 24 hours. This process calculates the diurnal {mean pressure, amplitude of pressure cycles, cycle counts} and derives the diurnal cumulative pressure-induced stress for each measurement location.

Together these values can be used to estimate the diurnal cumulative pressure-induced stress and the rate of stress accumulation. A summary of diurnal stress can then be communicated to the central server at step 20_7 together with other pressure-related data.

Figure 9:
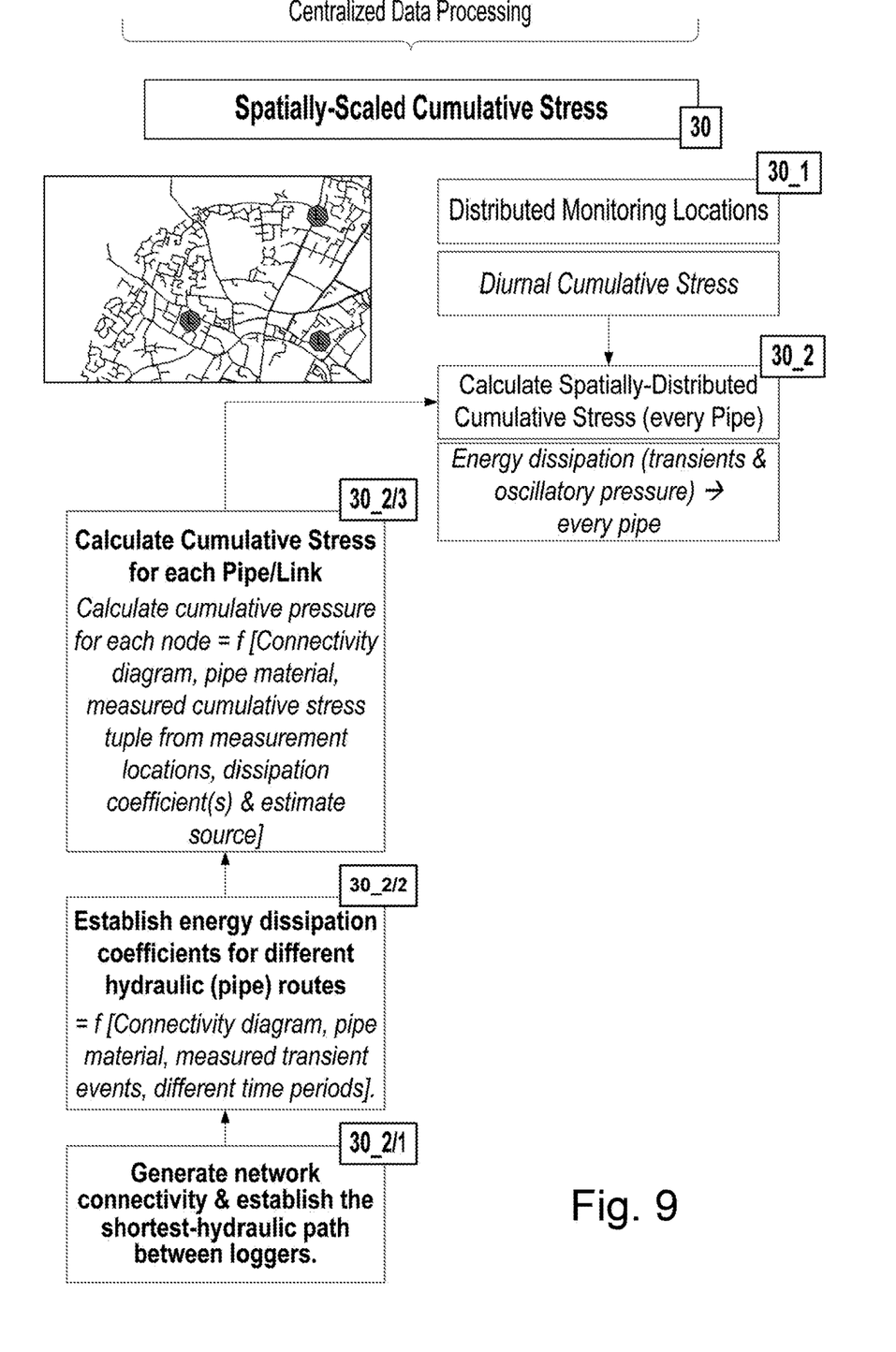
FIG. 9 illustrates a process for calculating spatially scaled cumulative stress.

At step 30, illustrated in more detail with reference to FIG. 9, spatially-scaled cumulative pressure-induced stress can be understood. This centralised step incorporates the results forwarded from individual devices with respect to the cumulative pressure-induced stress in each location at step 30_1.

In order to be able to extrapolate the measured cumulative pressure-induced stress from the monitoring sites to all pipes within a distribution zone, a method is provided which takes into account the energy dissipation mechanisms and pressure wave celerity based on pipe material, length, network topology and customer connections etc. Using advances in graph theory, a network connectivity schematic is derived which automatically traces the shortest hydraulic paths between the monitoring locations (step 30_2/1). Based on the network connectivity schematic, pipe material, length and detected transient events at multiple time-synchronised locations, energy dissipation coefficients and wave celerity values are calculated for different hydraulic routes (and pipes) (step 30_2/2). Consequently, energy dissipation coefficients and wave celerity values are established for every pipe with relation to the pressure monitoring locations by using the network connectivity schematic and pipes material.

The process then allows for the cumulative pressure-induced stress to be estimated for every pipe within a discrete zone by combining data provided at step 30_2/3 and 30_1 at step 30_2 to calculate spatially distributed cumulative pressure-induced stress for every pipe. This process can proceed without the need of detailed unsteady-state hydraulic models which are extremely difficult and costly to build and calibrate.

The estimated cumulative stress can then be spatially correlated with historic burst failures (e.g. and other deterioration-related variables) and used for the risk-based stress warning system as explained below with reference to FIG. 10.

Figure 10:
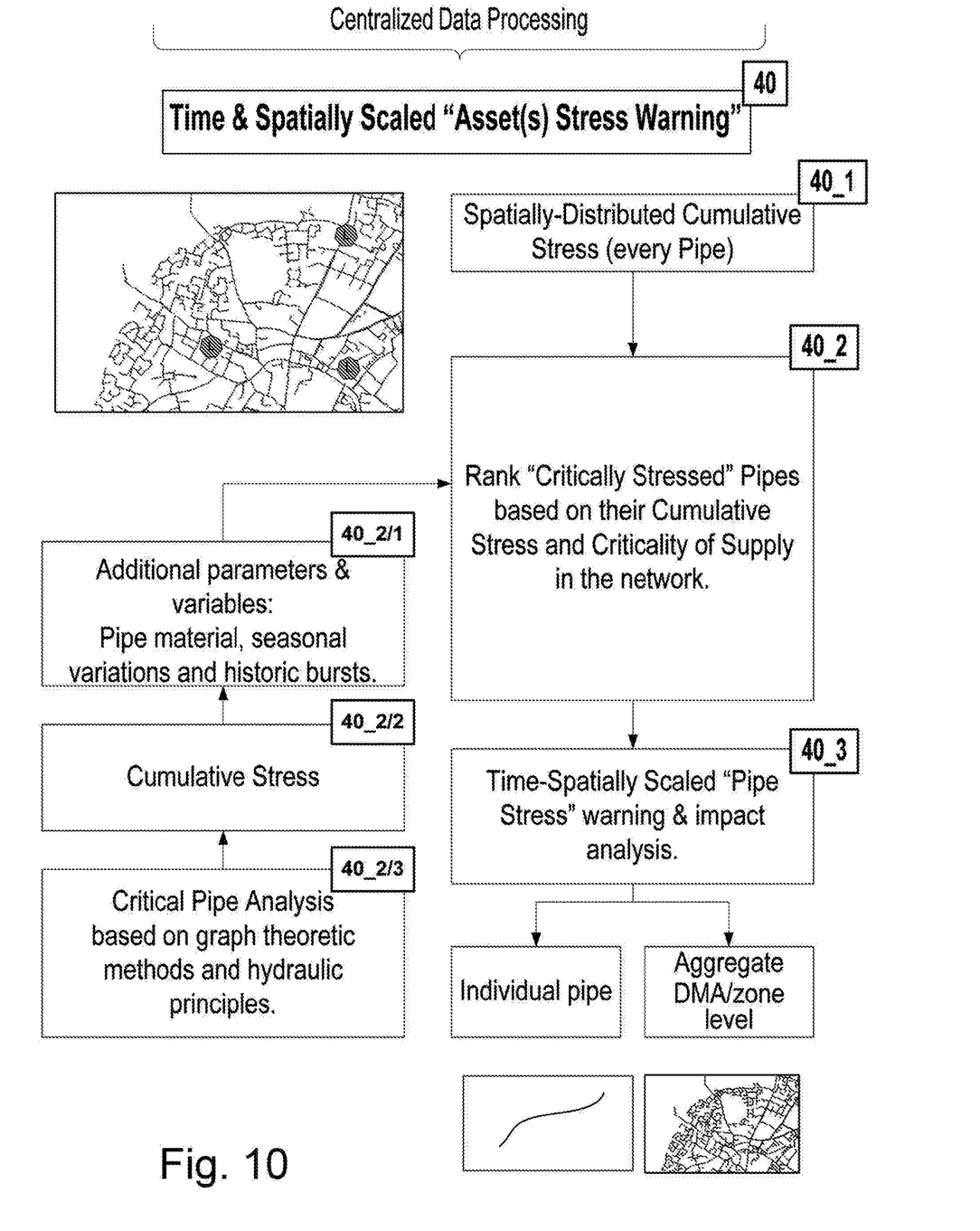
FIG. 10 illustrates a process for generating an asset stress warning.

FIG. 10 illustrates further details of step 40, which provides a time spatially scaled "Asset Stress (Health) Warning". Not all pipes are equally important in terms of the reliability of a water supply network. Operators require methods to assess the risk of failure of a particular pipe which allows them to prioritise operational interventions, resources and replacements. The spatially distributed cumulative pressure-induced stress calculated or estimated as explained above is provided at step 40_1 and combined with a measure of each pipes criticality to the system at step s40_2 to create a rank showing "critically stressed" pipes. This can be used to generate a time-spatially scaled "Pipe Stress" warning and impact analysis at step 40_3 which can be broken down to individual pipes and/or at an aggregated DMA (district metering area; i.e. a sector which has a discrete inlet) or zone level.

Various factors may be considered relevant when assessing a pipes criticality, as illustrated at steps 40_2/1, 40_2/2 and 40_2/3. Pipes that are essential to maintain the quality of supply to critical customers such as hospitals and/or might affect a large number of customers if fail should operate as close as possible to steady-state conditions (with a minimum cumulative pressure-induced stress threshold (step 40_2/2)). The critical pipe analysis combines graph theory and hydraulic metrics (step 40_2/3). Together with the measured/calculated cumulative stress and additional parameters such as pipe material (e.g. brittle cast iron), seasonal variations in temperature, soil-shrink swell, soil corrosivity and historic bursts (step 40_2/1), the pipes are ranked as "critically stressed assets".

Variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A method for analysing the condition of a liquid conduit system comprising
    receiving data from at least one sensor indicative of pressure within the system;
    processing the data to generate an inflexion coded data subset for each sensor;
    cycle counting the inflexion coded data subsets across at least one time period to generate a tuple data subset for each time period comprising a count of pressure cycles, respective amplitudes of these pressure cycles, and an average pressure;
    calculating a cumulative pressure-induced stress for each of the at least one time periods using the respective tuple data subset; and
    determining a risk of failure of one or more mechanisms in the liquid conduit system based on the calculated pressure-induced stress.

2. The method according to claim 1, wherein the at least one time period comprises a first set of time periods of a first duration, and a second time period of a second duration encompassing the first set of time periods.

3. The method according to claim 2, wherein the first duration is one hour and the second duration is 24 hours.

4. The method according to claim 2 further comprising
calculating a rate of stress accumulation during the second time period from the calculated cumulative pressure-induced stress for each of the first set of time periods; and
further determining the risk of failure of the one or more mechanisms in the liquid conduit system based on the rate of stress accumulation.

5. The method according to claim 1, wherein the step of receiving data comprises receiving data from a plurality of sensors.

6. The method according to claim 5 further comprising
deriving a network connectivity schematic representing shortest hydraulic paths between the plurality of sensors; and
estimating the cumulative pressure-induced stress at locations between the sensors using the network connectivity schematic.

7. The method according to claim 1 further comprising providing an asset risk ranking for a location using the calculated cumulative pressure-induced stress for that location and a stored criticality rating for that location.

8. The method according to claim 1 further comprising identifying a transient event from the inflexion coded data subsets.

9. The method according to claim 8, wherein the step of identifying the transient event comprises
comparing edges within the inflexion coded data subsets with one or more probability distribution functions; and
identifying the transient event when a probability of a particular edge is less than a threshold value.

10. The method according to claim 8 further comprising characterising the identified transient event by defining a word consisting of a string of symbols, each symbol representing one of the edges of the transient event.

11. A computer program product comprising computer executable instructions for carrying out the method of claim 1.

12. An apparatus for analysing the condition of a liquid conduit system comprising
one or more sensors configured to provide data indicative of pressure within the system;
one or more processors configured to:
receive data from at least one sensor indicative of pressure within the system;
process the data to generate an inflexion coded data subset for each sensor;
cycle count the inflexion coded data subsets across at least one time period to generate a tuple data subset for each time period comprising a count of pressure cycles, respective amplitudes of the pressure cycles, and an average pressure;
calculate a cumulative pressure-induced stress for each of the at least one time periods using the respective tuple data subsets; and
determine a risk of failure of one or more mechanisms in the liquid conduit system based on the calculated pressure-induced stress.

13. The apparatus according to claim 12, wherein the at least one time period comprises a first set of time periods of a first duration, and a second time period of a second duration encompassing the first set of time periods.

14. The apparatus according to claim 13, wherein the first duration is one hour and the second duration is 24 hours.

15. The apparatus according to claim 12, wherein the one or more processors are further configured to
calculate a rate of stress accumulation during the second time period from the calculated cumulative pressure-induced stress for each of the first set of time periods; and
further determine the risk of failure of the one or more mechanisms in the liquid conduit system based on the rate of stress accumulation.

16. The apparatus according to claim 12 comprising a plurality of sensors, wherein the one or more processors are further configured to
derive a network connectivity schematic representing shortest hydraulic paths between the plurality of sensors; and
estimate the cumulative pressure-induced stress at locations between the sensors using the network connectivity schematic.

17. The apparatus according to claim 12, wherein the one or more processors are further configured to provide an asset risk ranking for a location using the calculated cumulative pressure-induced stress for that location and a stored criticality rating for that location.

18. The apparatus according to claim 12, wherein the one or more processors are further configured to identify a transient event from the inflexion coded data subsets.

19. The apparatus according to claim 18, wherein identifying the transient event comprises
comparing edges within the inflexion coded data subsets with one or more probability distribution functions, and
identifying the transient event when a probability of a particular edge is less than a threshold value.

20. The apparatus according to claim 18, wherein the one or more processors are further configured to characterise the identified transient event by defining a word consisting of a string of symbols, each symbol representing one of the edges of the transient event.

* * * * *